Patented Sept. 12, 1939

2,172,534

UNITED STATES PATENT OFFICE 2,172,534

CATALYTIC DEHYDROGENATION OF HYDROCARBONS

Aristid V. Grosse, Chicago, Ill., assignor to Universal Oil Products Company, Chicago, Ill., a corporation of Delaware No Drawing. Application October 15, 1936, Serial No. 105,712

5 Claims. (Cl. 260—683)

This invention relates particularly to the manufacture of catalysts useful in reactions among hydrocarbons.

In a more specific sense, the catalysts with which the invention is concerned are especially applicable to reactions involving the dehydrogenation of various classes of hydrocarbons such as the production of mono olefins from paraffins, the further production of diolefins from the mono-olefins, and the manufacture of cyclic or aromatic hydrocarbons either directly from straight-chain paraffins of at least six carbon atoms in linear arrangement (or the corresponding unsaturated chain compounds) by reactions involving ring closure.

It has been shown that very effective catalysts for accelerating the above indicated types of reactions are produced by depositing minor proportions of compounds of certain metals, and particularly their oxides, upon activated aluminum oxide, which may be produced by the controlled ignition of the precipitated hydroxide or by a similar treatment of naturally occurring aluminum oxide minerals, such as bauxite, diaspore, dawsonite, et cetera. In the preparation of activated alumina from these sources the preferred procedure is to ignite it at a temperature of approximately 1500° F. to 1600° F. and then grind and size to produce particles of approximately 10 to 30 mesh. The prepared granular carrier is then treated to markedly increase its catalytic activity with salts of certain preferred elements to be presently enumerated either by suspending the aluminum oxide granules in solutions of soluble compounds of the metals and depending upon the adsorptive capacity of the alumina for the extraction of the compounds or evaporating the solutions to dryness to leave the soluble materials on the alumina granules.

Catalysts prepared in this manner are utilized in hydrocarbon dehydrogenation reactions by placing them in chambers or tubes as filling material and then flowing a preheated stream of hydrocarbon vapor or gas through the catalytic mass. Even though these types of catalysts are unusually selective in accelerating only the desired dehydrogenation reactions to the exclusion of such reactions as demethanation, polymerization, et cetera, there is a gradual deposit of heavy carbonaceous by-products which in time coat the active surfaces of the catalyst granules and render regeneration with air or other oxidizing gas necessary. The so-called active life of these catalysts before they require regeneration will be governed by a number of factors, including the particular compound which has been deposited upon the alumina to increase its catalytic activity, the type of reaction and the conditions of operation as to temperature and pressure, which may vary in intensity.

In one specific embodiment, the present invention comprises the use in hydrocarbon reactions, particularly those of a selective dehydrogenating character, of catalysts comprising major proportions of alkalized aluminum oxide supporting as their more active ingredients minor proportions of compounds of elements comprised in the left-hand columns of groups 4, 5 and 6 of the periodic table.

I have found that by the addition of relatively minor proportions, usually of the order of 1% to 5% of hydroxides and carbonates of the alkali metals, to alumina prior to its impregnation with the active catalytic compounds mentioned, the useful life of the catalyst is greatly extended before regeneration is necessary and that the succeeding cycles corresponding to a practical rate of catalytic activity are also longer, so that in general the overall catalytic effectiveness is greatly increased. It will not be attempted to suggest an explanation of this phenomenon since too little is known of the effect of minor additions of promoters to catalysts in general, and in fact the catalytic art is principally on an empirical basis, so that little prediction is possible as to the materials which will best catalyze a given reaction.

According to the present invention, the addition of the alkali metal hydroxides or carbonates is made by either stirring the activated alumina granules in warm dilute solutions of such compounds as sodium hydroxide, potassium hydroxide and their corresponding carbonates, until an amount of equivalent alkali oxide corresponding to about 1% of the aluminum oxide has been adsorbed, after which the granular particles are filtered and washed and then receive the further addition of highly active catalytic substances selected from the compounds of the elements previously mentioned. In the impregnation with the alkalis it has been found preferable to employ solutions of from about 1% to 10% concentration, and if desired a dilute solution may be incorporated with the alumina granules and the water evaporated to leave a residual desposit of the alkaline material.

The elements comprised in the left-hand columns of groups 4, 5 and 6 of the periodic table whose compounds are preferably added to the alkalized alumina to make the catalysts of the present invention are tabulated below:

| Group 4 | Group 5 | Group 6 |
|---|---|---|
| Titanium | Vanadium | Chromium |
| Zirconium | Columbium | Molybdenum |
| Cerium | Tantalum | Tungsten |
| Hafnium |  | Uranium |
| Thorium |  |  |

In a general sense, all of the compounds of the above elements which are relatively non-volatile under the conditions of temperature and pressure which may be employed in hydrocarbon conversion reactions will have some catalytic activity, though there are variations both in respect to the types of compounds and in respect to the position of the various elements in the table. For a given element the most effective promoter catalysts are the oxides, and where there are several oxides the most effective are usually those corresponding to the lower valence of the element, these oxides either being produced from the higher oxides which may be initially deposited upon the alumina particles by a preliminary reduction with hydrogen or other reducing gas, or by the action of the hydrocarbons in the first stages of a run.

Another point which apparently influences the degree of catalytic activity of the various promoting substances which may be used is the reducibility of the oxides. In general the activity of the oxides of the preferred elements in hydrocarbon conversion reactions varies in some way with the reducibility of the oxides, so that, for example, the oxides of chromium, which are readily reduced at moderately elevated temperatures, may have somewhat higher activity than the oxides, for example, of titanium and zirconium, which are difficultly reducible. In the elements of the left-hand column of group 6, to-wit: chromium, molybdenum, tungsten and uranium, chromium again has the most outstanding value. Some anomaly is evident in the fact that the oxides of vanadium are particularly effective, in fact practically as effective as the oxides of chromium in some cases, so that the rule of catalytic activity being proportional to the reducibility of the oxides does not hold completely.

The additions of the preferred oxides of the elements are made preferably by utilizing, where possible, the nitrates of the elements in aqueous solution, the amount and concentration being chosen so that the particles are exactly wetted without leaving any excess of solution. In this way the nitrate solution is uniformly distributed and a succeeding ignition drives off the nitric acid and leaves a residue of an oxide which in most instances is the higher oxide, such as for example chromium trioxide $CrO_3$, which is later reduced to the sesquioxide $Cr_2O_3$ either by hydrogen or by hydrocarbon vapors, as already indicated. In the case of elements which have only one oxide which is apparently not reduced to any great extent, such as titanium, zirconium and hafnium, the initially deposited oxide acts as the catalyst.

As an alternative method for the development of catalytic oxides on the surfaces of the alumina particles recourse may be had to the method of precipitating hydroxides upon suspended alumina particles by the addition of alkali hydroxides or carbonates to solutions of soluble compounds. This method is preferable where the nitrates are not sufficiently soluble and where other compounds are readily soluble and more easily procurable.

In lieu of the use of soluble compounds catalytic materials may be added to the alkylized alumina by dry or wet mechanical mixing, although obviously greater care will need to be exercised to insure the even distribution of the promoters. This method is only utilized in rare instances, such as for example in the case of tantalum oxides.

The present types of catalysts are particularly effective in the conversion of paraffin hydrocarbons to the corresponding mono-olefins, in the conversion of mono-olefins to diolefins, in the direct conversion of paraffin hydrocarbons to diolefins, and in the conversion of paraffin or olefin hydrocarbons of at least six carbon atoms in linear arrangement into aromatic compounds. They are particularly applicable to the manufacture of mono-olefins from the normally gaseous paraffin hydrocarbons and as such find ready commercial application in the production of catalytically and thermally polymerizable olefins from the paraffinic gas mixtures containing principally compounds of 3, 4 and 5 carbon atoms, which are associated with the production and refining of petroleum. For example, in the case of cracked gas mixtures it is current refining practice to polymerize the 3 and 4 carbon atom olefins either by heat alone or by heat and catalysts to produce polymer liquids which are high anti-knock blending agents for gasoline of inferior anti-knock rating. After the olefins have been thus removed there is a paraffinic residual gas which cannot be directly converted into hydrocarbon liquids until the paraffins have been dehydrogenated to produce further quantities of polymerizable olefins.

Conditions of operation will vary with the type of reaction and the average molecular weight of the hydrocarbons undergoing treatment. When utilizing the present types of catalysts to produce mono-olefins from paraffins of 3, 4 and 5 carbon atoms the temperature range employed will be approximately 450° to 600° C. (842° to 1112° F.). The pressure will be substantially atmospheric and the time of contact with the catalytic material will be approximately 1 to 6 seconds. When it is desired to manufacture diolefins from mono-olefins with a minimum of side reactions it is preferable to employ temperatures of the order of 500° to 700° C. (932° to 1292° F.), subatmospheric pressures of the order of 0.25 atmospheres absolute and relatively low times of contact, which are generally below 1 second and which correspond to a primary selective loss of two hydrogen atoms. In manufacturing diolefins directly from paraffins the temperature range of 500° to 700° C. is preferred and also the subatmospheric pressure mentioned, but in this case it is generally necessary to employ a somewhat longer time of contact.

The present types of catalysts are also particularly applicable to what may be called "dehydrocyclization" reactions, in which hydrocarbons such as hexane or heptane are subected to catalytic contact at elevated temperatures to produce, respectively, benzol and toluol. This type of reaction is brought about at the higher temperature ranges, such as, for example, 550° to 700° C., under approximately atmospheric pressures and for somewhat longer times of contact of the general order of from 6 to 20 seconds, which permits not only the dehydrogenation of the straight-chain paraffin hydrocarbons but also a closure of the chain to produce the aromatic. In this type of reaction, using the preferred catalysts, it is noteworthy that the alkyl-substituting groups which may be present in the hydrocarbons undergoing treatment are not lost but appear as such in the aromatics. For example, in the case of the compound 2,3-dimethylhexane, the compound ortho-xylene is produced, and in the case of either 2-methylhexane or normal heptane, toluene is produced. Similarly, a nonane comprising a tri-methylhexane will produce mesitylene.

As an example of the improved efficiency of catalysts prepared by primary alkilizing an alumina base catalyst before the addition of a promoter, the following is given, although not with the intent of correspondingly limiting the scope of the invention.

An alkalized alumina was prepared by impregnating activated alumina with a dilute solution of sodium hydroxide so that on drying a 1% $Na_2O$-99% $Al_2O_3$ mixture was obtained. After drying, this was impregnated a second time in the usual way with a water solution of chromium nitrate, so that on drying, igniting, and finally reducing a mixed catalyst containing about 4% $Cr_2O_3$, 1% $Na_2O$ and 95% $Al_2O_3$, with a little water of hydration was obtained. Over this catalyst, n-butane was passed at 500° C. and atmospheric pressure and a contact time 3.5 seconds. An average yield of about 20%, based on the charge, of butylenes was obtained. On the catalyst, during the period of about 10 hours, carbon was deposited in an amount corresponding to only 0.2% of the butylenes produced.

For comparison, a similarly prepared catalyst without the preliminary alkalizing step was used under the same conditions during a period of 25 hours, which gave practically the same or a slightly higher yield of butylenes. The amount of carbon deposited corresponded to 2% of the butylenes obtained or, in other words, the rate of carbon formation was about 10 times faster compared to the new alkalized catalyst.

The nature of the present invention and the advantages accruing from its use have been shown by the preceding specification and numerical data respectively, although neither section is intended to be unduly limiting upon the invention's generally broad scope.

I claim as my invention:

1. In the dehydrogenation of hydrocarbons by subjecting thereof to dehydrogenating conditions in the presence of a mixture of a major proportion of aluminum oxide and a minor proportion of a dehydrogenating catalyst of greater catalytic activity than the aluminum oxide, the improvement which comprises incorporating a relatvely small amount of an alkali metal oxide into the aluminum oxide prior to the addition of said dehydrogenating catalyst thereto.

2. The process as defined in claim 1 further characterized in that said dehydrogenating catalyst comprises a compound of a metal from the left-hand column of group IV of the periodic table.

3. The process as defined in claim 1 further characterized in that said dehydrogenating catalyst comprises a compound of a metal from the left-hand column of group V of the periodic table.

4. The process as defined in claim 1 further characterized in that said dehydrogenating catalyst comprises a compound of a metal from the left-hand column of group VI of the periodic table.

5. In the dehydrogenation of hydrocarbons by subjection thereof to dehydrogenating conditions in the presence of a mixture of a major proportion of aluminum oxide and a minor proportion of chromium oxide, the improvement which comprises incorporating a relatively small amount of an alkali metal oxide into the aluminum oxide prior to the addition of the cromium oxide thereto.

ARISTID V. GROSSE.